Oct. 16, 1962 W. H. RYAN ETAL 3,058,393
LIGHT-POLARIZING FILM MATERIAL AND THE PROCESS OF PREPARATION
Filed March 27, 1958 2 Sheets-Sheet 1

INVENTORS
William H. Ryan
Leonard C. Farney
BY
Brown and Mikulka
ATTORNEYS

INVENTORS
William H. Ryan
and
BY Leonard C. Larney

Brown and Mikulka

ATTORNEYS

United States Patent Office 3,058,393
Patented Oct. 16, 1962

3,058,393
LIGHT-POLARIZING FILM MATERIAL AND THE PROCESS OF PREPARATION
William H. Ryan, Lincoln, and Leonard C. Farney, Melrose, Mass., assignors to Polaroid Corporation, Cambridge, Mass., a corporation of Delaware
Filed Mar. 27, 1958, Ser. No. 724,327
5 Claims. (Cl. 88—65)

This invention relates to an improved light-polarizing film material and to the method of producing said material.

Objects of the invention are to provide a composite light-polarizing film material embodying a relatively thin layer in which a dichroic dye is concentrated for more efficient polarizing action; to provide a composite film material comprising a stretchable, molecularly orientable, film-like coating adapted to accept a dichroic stain or a dichroic direct cotton dye, the coating being formed on a transparent stretchable supporting material; to provide a coating and a supporting material of the character described which are adapted to adhere firmly to one another; to provide a light-polarizing film material of the character described having a suitable dye density and a high density ratio; and to provide a rapid and economical method for producing a relatively thin light-polarizing coating, thus obviating manufacturing problems customarily encountered in casting methods, such as the long period required for the elimination of bubbles and the steps necessary to prevent gelation of a casting solution.

Other objects of the invention are to provide a film material of the character described wherein the coating is a hydroxyl-containing vinyl polymer such as polyvinyl alcohol or is a mixture or reaction product involving such a polymer and, where a dichroic dye is to be employed, which may also comprise a basic nitrogen-containing compound or polymer, a cross-linking agent, and a solvent; to provide a film material wherein said supporting material may also be formed of a hydroxyl-containing vinyl polymer or another stretchable material; to provide a film material as described wherein the dye is distributed so as either to polarize light uniformly throughout its area or to polarize light differentially in image areas thereof; to provide a light-polarizing film material of the character described wherein light-polarizing image areas are substantially free from inward or lateral diffusion of the dye and hence are of superior definition; to provide light-polarizing images in which unwanted ghost images are substantially imperceptible; and to provide image-bearing, light-polarizing film materials in the form of transparencies, reflection prints or motion picture sequences comprising stereoscopic pairs of light-polarizing images having light-polarizing axes or directions which are angularly disposed relative to one another, said images being in the form of either monochrome or multicolor prints.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
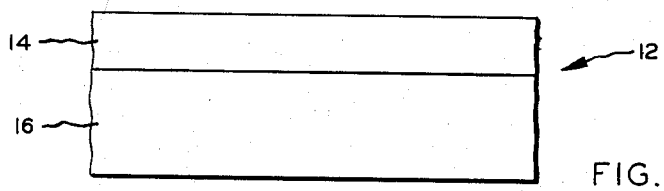
FIGURE 1 is a diagrammatic, fragmentary side view of a film material of the invention adapted to be used in forming a light polarizer.

Known methods of producing light-polarizing film materials include that of imbibing a dichroic direct cotton dye into a plastic film material of a type which has been stretched to provide therein a high degree of molecular orientation. The plastic film material may, for example, be composed of a transparent, molecularly oriented, linear high molecular weight, hydroxyl-containing vinyl polymer, a preferred form of said material being polyvinyl alcohol. Where the dichroic dye is adsorbed by the film material, the latter is rendered light polarizing. The dichroic dye may be distributed uniformly throughout the film material, in which instance a light-polarizing sheet of substantially uniform density is provided which may be employed for various purposes, for example, in the ophthalmic and photographic fields in the production of light-polarizing lenses and filters. On the other hand, the dye may be distributed differentially throughout the film material, as provided by a line, half-tone or full-tone printing or transfer method, in the formation of light-polarizing images of photographic quality. Such images are employed in forming stereoscopic prints in which the right- and left-eye polarizing images usually have their polarizing directions extending at 90° with respect to one another. This is made possible by printing from printing matrices or other printing means each of a stereo pair of monochromatic dichroic dye images or the several color images making up a pair of stereoscopic images in full color on individual molecularly oriented films of the type above described, the two films of a stereoscopic pair being laminated to a support in superposed relation and with their directions of molecular orientation preferably being relatively disposed at 90°.

In the production of dichroic dye light polarizers of high efficiency it is generally desirable that they shall polarize light throughout the visible spectrum of 400–700 m$\mu$ and that the dichroism or dichroic ratio, alternatively termed the density ratio $R_d$ and hereinafter given the latter appellation, shall be as large as possible. However, previous manufacturing methods relating to dichroic dye polarizers have, in general, not contributed to the obtaining of high density ratios, even though possessing other advantages, and, in fact, more often than not they may have operated against such an objective. In this category may be mentioned, as independent procedures, the use of cross-linking agents for providing dimensional stability of the film and the employment of dye mordants for facilitating transfer of the dichroic dye to the film and stabilizing the dye therewithin. As hereinbefore intimated, it is an object of the present invention to produce light-polarizing film materials having high density ratios in addition to possessing such other essential qualities as satisfactory dye densities, good image definition, inseparable adhesion of film layers, and dimensional stability. The term "dichroic," as applied to light polarizers has the meaning "exhibiting anisotropic absorption of light," that is, exhibiting differential absorption of the components of an incident beam depending upon the vibration direction of the components. It is to be understood with respect to the production of a light polarizer of the type contemplated herein that the property of dichroism manifests itself only when the film is a molecularly oriented film, this condition, accordingly, being prerequisite to the obtaining of high density ratios. Thus, any use of substances of the type mentioned herein in conjunction with a molecularly unoriented material would bear no relation to the production of a dichroic dye light polarizer.

A brief preliminary consideration of the properties and operation of dichroic light polarizers, in general, is believed to be in the interests of making clear the particular qualities of film materials of the present invention which relate to dichroism. The light-polarizing properties of polymeric film materials of the type contemplated herein can be ascribed to an adequate area concentration of oriented dichroic material. Dichroic polarizers have differing dimensional characteristics and, in film materials of the invention, one of these dimensions can be made very large as by stretching the film to obtain a high degree of molecular orientation. Assuming the film to be stretched in a given direction, the long dimension in the plane of the film may be termed the $z$ direction; the transverse direction in the plane of the film the $y$ direction; and the normal to the $y$—$z$ plane the $x$ direction.

The dichroic polarizer has at least orthorhombic symmetry with principal absorption coefficients $a_x$, $a_y$, $a_z$ associated with the aforesaid three nonequivalent directions. The polarizing effect depends upon the inequality $a_y \pm a_z$. In producing the light-polarizing film material, the significant variables are the area concentration $C$ of oriented dichroic material, i.e., oriented molecular groups having an adsorbed dichoic dye, and the degree of orientation thereof. The area concentration $C$ can be varied practically at will over a wide range. The degree of molecular orientation of a given dichroic material can be held substantially constant throughout the film and, for maximum efficiency, is at or near the practical maximum obtainable for said dichroic material.

From the aforesaid principal absorption coefficients $a_y$ and $a_z$ and the area concentration $C$ may be expressed the principal densities $d_y$ and $d_z$ as follows:

$$d_y = a_y C$$
$$d_z = a_z C$$

where $C$ is in mass per unit area and where, accordingly, $a_y$ and $a_z$ are the absorption coefficients in mass per unit area of the dichoic material. The principal densities are thus seen to be proportional to the amount of absorbing material per unit area.

The relation of the density and absorption ratios may be expressed as follows:

$$R_d = d_z/d_y = a_z/a_y$$

The density ratio $R_d$ having been seen as equal to the ratio of the principal absorption coefficients, it follows that $R_d$ is a constant for a given dichoic material with respect to variation of the area concentration $C$ or to variation of the thickness of the film, provided said area concentration is not increased to a critical value such that the density $d_z$ will no longer increase in proportion to increases of $C$. However, the transmittance ratio $R_t$, namely, the ratio of the transmittance of polarized light with the electric vector parallel to the $y$ direction to the transmittance of polarized light with the electric vector parallel to the $z$ direction, is not independent of the area concentration $C$ and increases exponentially therewith. The density ratio $R_d$ may, alternatively, be expressed as $d_2/d_1$ according to usage in the light-polarizing art, $d_1$ being considered as the density (theoretically zero) pertaining to observation of a polarizer through an analyzer with transmission axes parallel and $d_2$ as the density (theoretically infinite) when the analyzer is rotated 90°. In dye polarizers, such as may be used in the production of multicolor light-polarizing images the values $d_z$ and $d_y$ ($d_2$ and $d_1$) vary with wavelength, the density ratio $R_d$ thus also being caused to vary with wavelength. For a further discussion of the aforesaid theoretical considerations, reference may be had to the Journal of the Optical Society of America, vol. 41, No. 12, pages 976–986, December 1951, "On the Properties of Polarization Elements as Used in Optical Instruments," by C. D. West and R. Clark Jones, and to Colloid Chemistry, vol. 6, chapter 6, pages 160–190, Reinhold Publishing Corporation, 1946, "Dichroism and Dichroic Polarizers," by Edwin H. Land and C. D. West.

The high order of molecular orientation of a hydroxyl-containing vinyl polymer, such as polyvinyl alcohol, contributing to desired density ratios and polarizing efficiency of the film when subsequently dyed, is usually obtained by stretching the polymer when it is in the form of a film. Stretching of this film, prior to the usual procedure of laminating it to a supporting transparent base material, is preferably performed in the presence of heat or a softening agent, the direction of molecular orientation being substantially parallel to the direction in which the opposed tensional forces are applied. The degree of stretch imparted to a plastic film is empirically measured by what, in the light-polarizing art, has been termed the axial ratio. The axial ratio is determined from a small circle printed on the film prior to stretching. The circle is converted to an ellipse by the stretching operation, the major axis of the ellipse extending in the direction of stretch. The axial ratio is the ratio of the major axis to the minor axis of the ellipse. In general, high axial ratios are identified with high efficiency of the film when converted to a light polarizer. An axial ratio of the order of 3 and greater is a characteristic of a dichroic dye polarizer of high molecular orientation. Current production practices, for example, are adapted to provide axial ratios of approximately 6 for molecularly oriented polyvinyl alcohol film. The present invention, involving the formation of light-polarizing images, contemplates the production of film materials having axial ratios of 6 and higher. For certain purposes, however, lower axial ratios as, for example, an axial ratio of 4.5, may be satisfactory.

The method of the present invention departs basically from the techniques heretofore employed in manufacturing dichroic dye light polarizers in that it involves a rapid, easier and more economical way of producing a light polarizer by coating a solution of a molecularly orientable and potentially light-polarizing polymeric substance or mixture on a deformable, transparent layer of supporting material to which the coating is adapted to adhere firmly and inseparably; then solidifying the coating; stretching both the coating and supporting layer in a given direction as a unit; laminating the supporting layer to a transparent, dimensionally-stable base; and applying a dichroic direct cotton dye to the coating. The foregoing method will be seen to also provide several important structural and optical advantages, all of which exist in conjunction with the subsequent use of a dichroic direct cotton dye and certain of which may also exist when a dichroic stain is employed.

As a novel feature of the present invention, it is possible to form an extremely thin layer of the polymeric material which is to be rendered light polarizing, for example, a layer having a dry thickness of the order of 0.0001" to 0.0005", and to readily stretch this thin layer while supported by the supporting layer to obtain its molecular orientation. To obtain a thin film of the character of the above-described coating by a casting method, to stretch such a film in an unsupported condition, and to then laminate it to a supporting layer would be impossible because the film would be too fragile to withstand such a procedure.

Where the film is to be a dichroic dye polarizer, formation of the potentially light-polarizing layer as a coating also permits the use of certain materials contributing to improved optical results which would not readily be possible through a procedure of laminating a potentially light-polarizing layer directly to a base. For example, the proper combination with polyvinyl alcohol of a basic nitrogen-containing compound, a cross-linking agent and a dichroic direct cotton dye is known to produce a light polarizer having a high density ratio, this being a desirable characteristic, as described above. In the commercial production of light polarizers by a laminating technique, a preferred base material is subcoated cellulose triacetate or cellulose acetate butyrate. However, the inclusion of a cross-linking agent as an element of the potentially light-polarizing layer with polyvinyl alcohol or a derivative, and, additionally with a basic nitrogen-containing compound having a mordanting function operates against the establishment of a proper direct bond with the foregoing surface treated base materials or to subcoats conventionally employed therewith. Furthermore, the presence of a cross-linking agent tends to render thin films of the type contemplated herein too brittle to handle in an unsupported condition. By the coating method of the present invention it is possible to employ any of several cross-linking agents and to obtain a film adapted to bond firmly with a supporting layer which permits the use, also, of preferred base materials such as cellulose triacetate or cellulose acetate butyrate; to manufacture a film having the aforesaid desirable light-polarizing characteristics; and to produce a film having sufficient strength and flexibility so that it will not be destroyed during handling.

A preferred material for employment as a supporting layer with a light-polarizing coating of the character described is polyvinyl alcohol, untreated by a hardening agent, or a polyvinyl alcohol derivative such as a polyvinyl acetal, because of the adaptability of such a material to stretching and forming a firm bond with the coating. Other materials can be used with satisfactory results to form the supporting layer, provided the stretching temperatures of the supporting layer and coating are, in general, similar. Rubber hydrochloride, for example, has been employed successfully for such a purpose. The thickness of the supporting layer need be no greater than is required for its supporting function and adaptability to a required stretching. In general, it is desirable to keep the supporting layer as thin as possible as, for example, to contribute to the pliability of the finished film. Assuming, for example, the supporting layer to be formed of polyvinyl alcohol, an initial thickness thereof of 0.0015" may be considered as satisfactory in making a production type of light-polarizing sheet.

An advantage attributable to the relatively thin light-polarizing coating is the avoidance of crazing during the dyeing step. Light-polarizing filters having relatively thick laminated light-polarizing layers which include a cross-linking agent are sometimes caused to craze during permeation, to any considerable depth by the dye solution or by other processing liquids. Again, the coating method of the invention substantially reduces or eliminates the time-consuming step of debubbling a casting solution. For example, for casting purposes a relatively large quantity of a mixture of polyvinyl alcohol, a basic nitrogen-containing compound and dimethylolurea may be required to stand at an elevated temperature for several hours or even days to eliminate bubbles. This procedure may cause gelation, particularly where in the process of producing a uniformly polarizing film, a dye is added to the casting mixture. In the present instance, it is only necessary to prepare, filter and cool a relatively small amount of the coating solution prior to applying it to the supporting film.

Again referring to the aforementioned preferred molecularly oriented, light-polarizing coating having a high density ratio and comprising polyvinyl alcohol or a derivative, a basic nitrogen-containing compound, a cross-linking agent, and a dichroic direct cotton dye, said coating having been applied to a supporting layer of polyvinyl alcohol, a water-methanol solution is preferably employed in forming the coating mixture. The inclusion of methanol serves to restrain the solution from penetrating deeply into the polyvinyl alcohol supporting layer during application of the coating, thereby preventing the supporting layer from softening, swelling, wrinkling or dissolving. It also greatly speeds up the drying of the surface coating. The cross-linking agent is difunctional and has functional groups capable of reacting with the hydroxyl groups of the polyvinyl alcohol, or, where applicable, with residual hydroxyl groups of a basic nitrogen-containing polymer to form covalent bonds resulting in cross-linking and concurrent reduction of water solubility. Suitable basic nitrogen-containing polymers for incorporation in the coating solution comprise an amino acetal of polyvinyl alcohol, deacetylated chitin, a $\beta$-diethylaminoethylmethacrylate polymer, or a polyvinyl pyridine quaternary ammonium salt. Cross-linking agents other than dimethylolurea which may be employed comprise boric acid, glyoxal and diphenyl diisocyanate.

FIG. 1 illustrates diagrammatically and in highly exaggerated dimensions a fragment of a composite film material 12 of the invention wherein a polymeric layer 14 has been applied as a coating to a preferably polymeric supporting layer 16, said layers both being deformable and of a type hereinbefore described and at least layer 14 being molecularly orientable when subjected to deformation.

Figure 2:
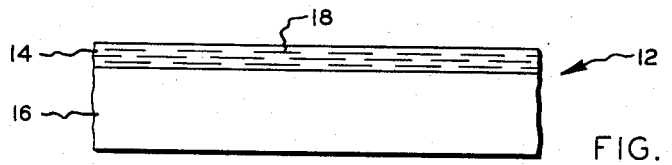
FIG. 2 is a diagrammatic, fragmentary side view of the film material of FIG. 1 after it has been stretched to effect its molecular orientation.

FIG. 2 shows diagrammatically a fragment of the composite film 12 after it has been stretched to obtain a high degree of molecular orientation of the coated layer 14. The polymeric molecular content and orientation within the layer 14 is diagrammatically illustrated by the longitudinally-extending broken lines 18. The layer 16, although not so indicated, may also in all probability be molecularly oriented and, if composed of polyvinyl alcohol, is to be understood as thus oriented. Molecular orientation of the layer 16, or lack of molecular orientation thereof, has no significance, however, with respect to the polarizing properties of the completed composite film.

Figure 3:
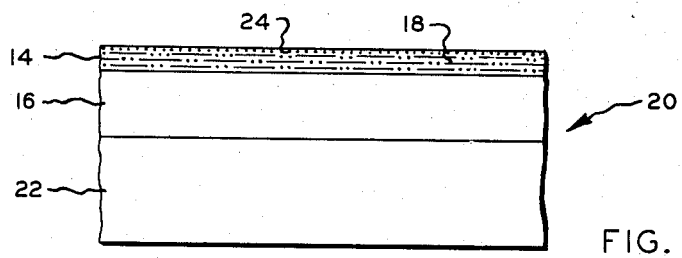
FIG. 3 is a diagrammatic, fragmentary side view of the film material of FIG. 2 after its lamination to a base and treatment with a dye to form a light polarizer.

In FIG. 3 a light-polarizing film material 20 is shown in which the supporting layer 16 has been laminated to a transparent plastic base 22 and thus becomes an intermediate layer. Base 22 is composed of a dimensionally-stable material such as cellulose triacetate or cellulose acetate butyrate adapted to have the stretched molecularly oriented supporting layer 16 laminated inseparably thereto and to hold the latter fixed against any tendency to return to its unstretched dimensions. A suitable bonding agent such as an aqueous solution of chromic nitrate and one or more subcoats, as may be necessary, are employed for laminating the layers 16 and 22 together. A dichroic direct cotton dye 24 has been taken up by the layer 14. The dye may be considered as either having been transferred from a printing matrix in the form of an image or applied evenly throughout to provide a uniformly polarizing film.

The method contemplated herein, as it particularly relates to the obtaining of improved density ratios in conjunction with other advantages, above described, involves the use of dichroic direct cotton dyes in conjunction with the molecularly oriented film produced from the aforesaid high molecular weight hydroxyl-containing vinyl polymer, the basic nitrogen-containing compound, and the cross-linking agent, one or more of said dyes being adsorbed into the film to render it light polarizing. More particularly, the invention contemplates the use of direct cotton dyes which have sulfonic acid groups, phenolic hydroxyl groups or carboxylic acid groups. Examples of direct cotton dyes which are suitable for the purpose are Niagara Sky Blue 6B (C.I. 518), Solophenyl Fast Blue Green BL 200%, or Niagara Sky Blue (C.I. 520) for cyan; Solantine Red 8BL (C.I. 278), Chlorantine Fast Red 5B, or Solantine Pink 4BL (C.I. 353) for magenta; Solantine Yellow 4GL (Prototype 53), Pyrazoline Orange 5G, or Stilbene Yellow 3GA (C.I. 622) for yellow; and Erieform Violet 2R for blue-violet. In conformance with the aforesaid considerations with respect to proper dyes, it will be apparent that basic dyes which lack an acid group would be unsuitable for the purpose. The following table indicates typical density ratios obtained relative to light-polarizing film materials formed according to the method of the present invention. In each instance the film was wetted prior to dyeing.

surface molecules operate to lengthen the time which is required for the film to accept a dichroic direct cotton dye, while the addition of the basic nitrogen-containing compound tends to diminish the time which is thus required, the aforesaid steps, taken together, providing, at least in large measure, the improved density ratios. From a production viewpoint, it is understandably desirable to facilitate the dyeability of the film and it is particularly important that the dye shall be transferred from the matrix to the film as quickly as possible in the process of forming dichroic dye images to obtain good definition.

| 1 | 2 | 3 | 4 | 5 | 6 | 7 |
| --- | --- | --- | --- | --- | --- | --- |
| Direct Cotton Dye | Basic Nitrogen-containing Polymer | Hydroxyl-containing Vinyl Polymer | Cross-linking Agent | Density Ratio | Density Ratio without #4 | Density Ratio without #2 and #4 |
| Chlorantine Fast Red | A polyvinyl acetal of benzaldehyde-4-trimethyl ammonium iodide. | polyvinyl alcohol | dimethylolurea | 21.5 | | 15.9 |
| Solantine Red 8BL (C.I. 278). | do | do | do | 15.3 1-color / 14.9 3-color | 7.7 | |
| Solophenyl Fast Blue Green BL 200%. | do | do | do | 16.8 1-color / 12.4 3-color | 3.6 | 6.8 |
| Pyrazoline Orange 5G | do | do | do | 19.1 1-color / 11.7 3-color | 5.8 | 14.2 |
| Erieform Violet 2R | do | do | do | 13.0 | | 10.3 |

The reason for the improved density ratios characteristic of certain of the light-polarizing materials described herein has not been entirely established. It is believed, however, that the combination of the basic nitrogen-containing compound and the cross-linking agent with the hydroxyl-containing vinyl polymer and dichroic direct cotton dye primarily serves to maintain a high degree of molecular orientation adjacent that surface of the film into which the dye is imbibed, together with providing a marked propensity for receiving the dye. These properties lead to an adequate dichroism and dye density in areas which would otherwise be deficient in one or both respects. In conventional methods of manufacturing light polarizers, treatment of a molecularly oriented film of a hydroxyl-containing vinyl polymer such as polyvinyl alcohol with an aqueous dye or a pretreatment solution and the resulting swelling of the material is believed to disrupt the orientation of the molecules which are loosely arranged adjacent the film surface. Hence, the surface areas, where a large concentration of dye usually exists, are deficient with respect to the property of dichroism. In the method of the present invention, the cross-linking agent is believed to form relatively rigid links between the surface molecules, thus substantially preventing their changing position once aligned. However, the cross-linking agent tends to reduce the ability of the film to adsorb an aqueous dye solution. This reduction in dye affinity is overcome by the basic nitrogen-containing compound which acts to increase the rate of acceptance of the aqueous dye solution.

The ability of the basic nitrogen-containing compound to offset the decrease in dye acceptance caused by the cross-linking agent is believed to be principally due to the fact that said basic nitrogen-containing compound or reaction product carries a positive charge. It is thus particularly effective for use with dichroic direct cotton dyes which include acid residues in their molecular structure as, for example, sulfonic acid groups or phenolic groups, said dyes being thereby negatively charged. The resulting electrostatic attraction between oppositely charged molecules of the compound material and dye constitutes a condition where the dye is attracted and held fast in an area which would otherwise not be readily dyeable or which would tend to permit an unwanted lateral diffusion of the dye where dichroic dye images are involved.

As hereinbefore intimated, the stretching operation resulting in a high molecular orientation and the addition of the cross-linking agent providing the cross-linkage of surface molecules operate to lengthen the time which is required for the film to accept a dichroic direct cotton dye, while the addition of the basic nitrogen-containing compound tends to diminish the time which is thus required, the aforesaid steps, taken together, providing, at least in large measure, the improved density ratios. From a production viewpoint, it is understandably desirable to facilitate the dyeability of the film and it is particularly important that the dye shall be transferred from the matrix to the film as quickly as possible in the process of forming dichroic dye images to obtain good definition.

Thus, the molecular orientation of the film and the cross-linking agent on the one hand, and the basic nitrogen-containing compound on the other hand, in addition to their individual functions, compensate for each other's deficiencies and, in general, a direct relation exists between the concentration of the basic nitrogen-containing compound and the concentration of the cross-linking agent as well as between the concentration of said compound and the axial ratio. Thus, by way of example, assuming a condition where an axial ratio of 6 requires a concentration of the basic nitrogen-containing compound of 0.06 mol per base mol of total vinyl alcohol groups present for satisfactory acceptance of the dye, higher axial ratios would be accompanied by higher concentrations of the compound while lower axial ratios would require lower concentrations. A direct relation may also be considered as existing between concentrations of the compound and concentrations of the cross-linking agent to provide the required cross-linkage between the surface molecules. Exact quantities of the basic nitrogen-containing compound and of the cross-linking agent will, of course, depend somewhat upon manufacturing conditions and the use to which the film is to be applied.

The following example is illustrative of the method of forming the light-polarizing film material of the invention.

*Example*

147.42 grams of the methyl iodide quaternary salt of para-dimethylaminobenzaldehyde were dissolved in 1944 grams of water. 6.75 cc. of concentrated hydrochloric acid were added and the solution was thoroughly mixed. 486 grams of powdered polyvinyl alcohol were stirred into the mixture. The mixture was cooked 12 hours at 95° C. The mixture was cooled to approximately 70° C. and 1620 grams of methanol were added. A solution of 27.54 grams of dimethylolurea (Arboneeld A, trade name of, and manufactured by Polychemicals Department, E. I. du Pont de Nemours & Co., Wilmington, Delaware), in 572 grams of water and 0.65 gram of a surfactant or wetting agent (Triton X-100, trade name of, and manufactured by Rohm & Haas Co., Philadelphia, Pennsylvania), were stirred into the mixture. The mixture was filtered and cooled to room temperature. The mixture was applied as a coating to a continuously moving film of polyvinyl alcohol, 0.0015" thick, using a wire-wound coating rod to control thickness of the coating. The coated film was dried, stretched to provide an axial ratio of approximately 6, laminated to a subcoated base of cellulose triacetate, and subjected, on its coated surface, to an aqueous solution of a dichroic direct cotton dye.

Figure 4:
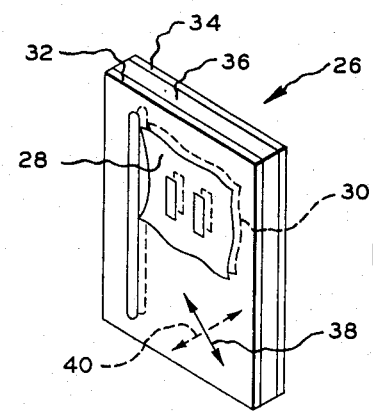
FIG. 4 is a diagrammatic perspective view of a three-dimensional print of the invention comprising film material of the general type exemplified by FIG. 3 and embodying a stereoscopic pair of light-polarizing images.

Referring to FIG. 4, there is illustrated a composite film unit 26 in which is included a pair of stereoscopic dichroic dye light-polarizing images 28 and 30 formed, respectively, in films or layers 32 and 34. The layers 32 and 34 may be considered as of the type shown in FIG. 2 and are bonded to a transparent central support 36. Alternatively, layers 32 and 34 could be similar to those shown in FIG. 3. Assuming, for simplicity of explanation, that the stereoscopic images are rendered in monochrome, the light-polarizing images 28 and 30 are printed on the opposite exposed surfaces of the assembly in suitable relative register for stereoscopic viewing. The molecular orientation of the layers 32 and 34 is indicated by the double-headed arrows 38 and 40, it being noted that the direction of orientation of each layer is at 45° to an edge of the assembly and at 90° to one another, this constituting a preferred, although not inflexible, arrangement.

Formation of the positive left-eye image 28 and the positive right-eye image 30 on layers 32 and 34, respectively, is carried out by transferring the dichroic dye from individual left- and right-eye positive printing matrices, the printed images generally overlying one another in accordance with the usual stereoscopic relationship of light-polarizing images. Where a stereoscopic print is rendered in full color, right- and left-eye sets of matrices, each set comprising red, green and blue color-separation positives, are employed to form the images. The three matrices of each set are impregnated, respectively, with cyan, magenta and yellow dichroic direct cotton dyes. Each matrix of a given set is then used in succession to transfer its respective color image to one of the molecularly oriented layers, the matrices of the first set, for example, being used to transfer the right-eye color images to the layer 34, and the matrices of the second set being similarly employed to transfer the left-eye color images to the other molecularly oriented layer 32. Viewing of the stereoscopic print is performed through light-polarizing glasses or viewers having polarizing axes appropriately crossed with respect to the images to be viewed.

While the stereoscopic print assembly of FIG. 4 is shown as an individual print which may be employed as a transparency or, with the added application of a reflection backing to layer 34, as a reflection print, and although either of said forms of individual print constitutes a useful embodiment of the film material of the invention, the print assembly may also be considered as illustrative of a frame of stereoscopic motion picture film. The present film material is particularly suitable for use in the motion picture field where the high magnifications involved usually require a high order of dye densities and image resolution. The light-polarizing film of the invention is capable of embodying dichroic dye images having densities of the order of at least 3 and an image resolution in excess of 60 lines per millimeter.

An important consideration in the production of light-polarizing stereoscopic pairs is the substantial reduction in perceptibility of unwanted so-called ghost images. A ghost image is sometimes visible when viewing a light-polarizing stereoscopic print or a projected image through light-polarizing viewers, even though the viewers are properly oriented, and can be very troublesome. Such an image is a relatively weak right-eye image which is visible to the left eye in addition to the left-eye image intended to be viewed by said eye, or it is a relatively weak left-eye image which is visible to the right eye in addition to the right-eye image intended to be viewed by said eye. It will be understood that the polarizing direction or axis of these unwanted densities or ghost images is substantially parallel to that of the analyzer through which they are seen and that in an ideal polarizer this density which is $d_1$ of the density ratio $d_2/d_1$ would be zero and hence invisible. However, a dichroic dye polarizer does not quite satisfy this standard of an ideal polarizer and $d_1$ represents a density value which, although small, may, nevertheless, be sufficient to permit its being visible under the above-described circumstances. The importance in this respect of the high density ratios which are characteristic of the light-polarizing film materials of the present invention will thus be apparent, where $d_2$ is made a given suitable density for the purpose, said ratios permitting $d_1$ to be so small as to render the unwanted density unnoticeable.

Transfer of dichroic dye images to be molecularly oriented film is preferably performed with the film preliminarily wetted to insure that contact between the printing matrix and film exists throughout the image area and to facilitate transfer of the dye. Water, an aqueous solution of sodium acetate or a mixture of sodium salicylate and sodium acetate or some other reagent or reagents, may be employed for the purpose.

Figure 5:
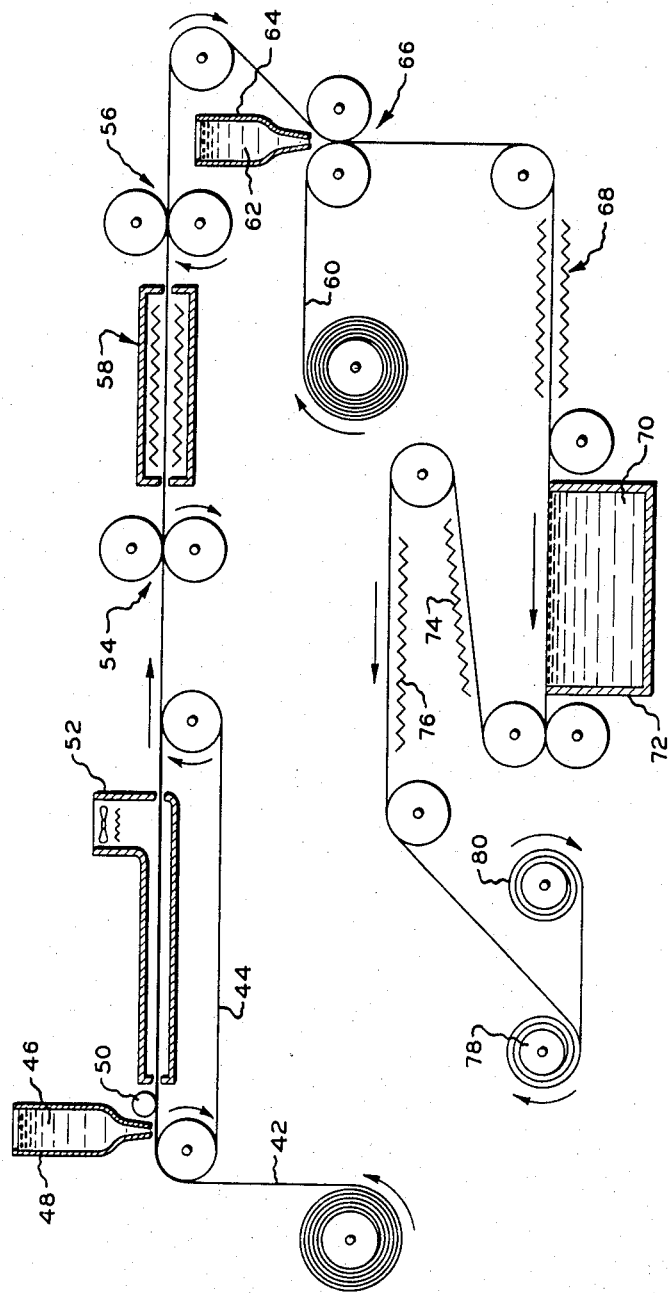
FIG. 5 is a diagrammatic representation illustrating the process of forming the light-polarizing film material of the invention.

FIG. 5 diagrammatically illustrates the method of forming a uniformly polarizing film material of the invention. A supply of a polyvinyl alcohol film 42, similar to the film 16 of FIG. 1, is fed to a moving belt 44. A supply of a coating liquid 46, adapted to form the coating 14 of FIG. 1, is dispensed to film 42 from container 48 and spread to a chosen given thickness by wire-wound coating rod 50. Drying of the coating is facilitated by the forced-air heater 52. The coated film is subjected to stretching by the differentially rotating pairs of rolls 54 and 56 and by the oven 58. After stretching, the film is laminated to a base film 60 composed, for example, of cellulose triacetate, by introducing a laminating liquid 62 from container 64 between films 42 and 60, the films then being compressed between a pair of pressure rolls 66. After the lamination is hardened by heaters 68, the coated surface is subjected, throughout, to a dichroic direct cotton dye 70, the dye, as shown, being applied from a continuously replenished tank 72. After the film is again dried, as by heaters 74 and 76, it is taken up on a roll 78, a layer of non-adhering paper 80 being employed to separate each turn of the film. Power means for moving the film through the aforementioned steps has been omitted as conventional, any suitable means for the purpose such as one or more electric motors, gearing, belt or chain drives, and a differential speed device for controlling rolls 54 and 58 being employed, as required. Directions of movement have been indicated by arrows to facilitate an understanding of the stepwise order of operations. It is to be understood that the dichroic dye might, alternatively, be included in the coating liquid 46. It will further be appreciated that in the method illustrated by FIG. 5 the step of uniformly applying the dye 70 could be supplanted by one in which the dye is applied from printing matrices to form light-polarizing images.

Although the film of FIG. 2 has been described as invariably laminated to a base to provide dimensional stability, supporting layer 16 can be rendered dimensionally stable to at least a degree such that when layer 14 is dyed with a dichroic dye the film would serve as a uniform light polarizer. Treatment of layer 16 by a cross-linking agent and the application of a coating which could be hardened to hold the stretched film from relaxing might be employed for the purpose. This method would involve deleting from FIG. 5 the step of laminating the base material 60 and the substitution of a means for applying a hardening treatment to one or both of the unitary film 42 and coating 46, after stretching. Referring to FIG. 4, it would be possible, alternatively, to print the image 28 on layer 32 and to then laminate layer 34 to layer 32 rather than to support 36. This would be followed by printing image 30 on layer 34. However, this suggested alternative method is not considered to be as desirable as that illustrated in FIG. 4.

It is to be understood that where a hydroxyl-containing, vinyl polymer, and more particularly polyvinyl alcohol, has been specified herein as a film material, a polymer which has not been completely hydrolyzed, i.e., polyvinyl alcohol having a small residual quantity of acetate groups as, for example, a partially de-esterified polyvinyl ester, could be employed for the purpose. It is further to be understood that diluents other than methanol, for example, dimethylformamide, may be employed and that a plasticizer or surfactant, such as Triton X–100, trade name of, and manufactured by Rohm & Haas Co., Philadelphia, Pennsylvania, and previously mentioned, may be added to the coating solution. Glycerine has been added to the preferred coating solution, hereinbefore described, without adversely affecting the printing quality of the film.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A composite light-polarizing sheet material of high efficiency comprising, in assembled relation, a first film composed of a transparent cellulosic material constituting a dimensionally stable base, a second extremely thin and intrinsically fragile light-polarizing film of substantially uniform thickness comprising, respectively, an elongated high molecular weight vinyl polymer, a dichroic dye and a dye mordant, interacting for a resultant improved polarizing efficiency, and a cross-linking agent for stability purposes, and a third intermediate supporting film composed of an elongated transparent polymeric material having one of its surfaces bonded to said base and its opposite surface directly bonded to said light-polarizing film, said base and light-polarizing film being at least functionally unadapted to bonding directly to one another but adapted to bonding to the opposite surfaces of said intermediate film and the fragility of said light-polarizing film being principally due to its extreme thinness and the presence of said cross-linking agent, said light-polarizing film being firmly bonded to one surface of said intermediate film by its initial application directly thereto as a thin liquid film and subsequent solidification, and having been further thinned and molecularly oriented to contribute to its light-polarizing properties while in bonded and supported relation with respect to said intermediate film by the joint elongation of said light-polarizing and intermediate films prior to bonding of said intermediate film to said base film.

2. A light-polarizing film material, as defined in claim 1, wherein said vinyl polymer is polyvinyl alcohol, and said third film is selected from the class consisting of polyvinyl alcohol and a derivative of polyvinyl alcohol.

3. A light-polarizing film material, as defined in claim 2, wherein said dye mordant is a basic nitrogen-containing compound and said cross-linking agent is dimethylolurea.

4. An improved process for producing a multi-film light-polarizing sheet material of high efficiency and stability, comprising the steps of casting an appropriate area of a first film composed of a transparent polymeric material adapted to elongation, directly applying a second extremely thin liquid film evenly to one surface of said first film, said liquid film comprising an aqueous methanol solution of a transparent high molecular weight vinyl polymer, a dye mordant and a cross-linking agent and being adapted to elongation when solidified and bonded to and supported by said first film, solidifying said second film, applying a mechanical stress to said first and second films as a unit to cause a further thinning of said second film and to provide a given molecular orientation therein, bonding the other surface of said first film to a surface of a dimensionally stable transparent cellulosic material, employing a proper adhesive for the purpose, and applying a dichroic dye to the exposed surface of said second film to render it light polarizing, said second film, when first formed, being extremely fragile due to its thinness and the presence of said cross-linking agent, but adapted to elongation and further thinning, without fracture, when bonded to and supported by said first film.

5. A process, as defined in claim 4, wherein said dichroic dye is applied as a printing step from a printing matrix to produce a light-polarizing image.

References Cited in the file of this patent

UNITED STATES PATENTS

| | | |
|---|---|---|
| 2,011,553 | Land | Aug. 13, 1935 |
| 2,239,718 | Izard | Apr. 29, 1941 |
| 2,286,569 | Pollack | June 16, 1942 |
| 2,328,219 | Land | Aug. 31, 1943 |
| 2,398,435 | Marks | Apr. 16, 1946 |
| 2,402,166 | Land | June 18, 1946 |
| 2,416,510 | Binda | Feb. 25, 1947 |
| 2,445,555 | Binda | July 20, 1948 |
| 2,445,579 | Hyman et al. | July 20, 1948 |

OTHER REFERENCES

Jones: "Polyvinyl Alcohol," British Plastics, vol. 16, February 1944, pages 77–83.